United States Patent [19]

Kiel

[11] Patent Number: 4,685,276
[45] Date of Patent: Aug. 11, 1987

[54] METHOD FOR PRODUCING AND FILLING BOTTOM-FOLD BAGS AND APPARATUS FOR EXECUTION OF THE METHOD

[75] Inventor: Hans R. Kiel, Verden/Aller, Fed. Rep. of Germany

[73] Assignee: Effem GmbH, Verden/Aller, Fed. Rep. of Germany

[21] Appl. No.: 793,052
[22] PCT Filed: Feb. 27, 1985
[86] PCT No.: PCT/DE85/00059
  § 371 Date: Dec. 18, 1985
  § 102(e) Date: Dec. 18, 1985
[87] PCT Pub. No.: WO85/03919
  PCT Pub. Date: Sep. 12, 1985

[30] Foreign Application Priority Data

Feb. 27, 1984 [DE] Fed. Rep. of Germany ....... 3407045
Jul. 4, 1984 [DE] Fed. Rep. of Germany ....... 3424654

[51] Int. Cl.[4] ............................................. B65B 43/10
[52] U.S. Cl. ....................................... 53/459; 53/570; 383/121; 493/218; 493/936
[58] Field of Search ................. 53/459, 570; 493/936, 493/218, 252, 193, 308; 383/121, 125

[56] References Cited

U.S. PATENT DOCUMENTS 596,373 12/1897 Lorenz ................................. 493/936
3,083,618 4/1963 Vergobbi ........................ 493/252 X
3,552,087 1/1971 Schneider .

4,365,459 12/1982 Sig .

FOREIGN PATENT DOCUMENTS 533685 12/1954 Belgium ............................. 493/936
2143819 4/1973 Fed. Rep. of Germany .

Primary Examiner—James F. Coan
Attorney, Agent, or Firm—Curtis, Morris & Safford

[57] ABSTRACT

Bottom-fold bags, made of endless tubular material, which can be made of endless flat material and having a substantially rectangular standing-surface, together with a method and apparatus for producing and filling such bags are disclosed. Two lateral, substantially triangular bottom-flaps, in the vicinity of which the tubular material is in three layers, are produced. The tubular material is folded-in from the sides of the bag being formed and a bottom longitudinal seam is formed by pressing the tubular material together and connecting together the layers of tubular material thus caused to bear upon one another. At least the two layers of the bottom-flaps facing away from the bottom-surface of the bag are united longitudinally. At least one connecting seam, arranged near the lateral edge of the bag, and at least one connecting seam, arranged near the apex of each triangular bottom-flap are provided, substantially at right angles to the bottom longitudinal seam. At least one of the connecting seams is of linear design and is divided in its longitudinal extension. The bags thus formed are then separated and filled with a freely flowing product. The bags are self-supporting and stand upright when filled.

24 Claims, 6 Drawing Figures

METHOD FOR PRODUCING AND FILLING BOTTOM-FOLD BAGS AND APPARATUS FOR EXECUTION OF THE METHOD

FIELD OF THE INVENTION

This invention relates to a method for producing and filling bottom-fold bags made of endless tubular material which in one embodiment of the invention is made of endless flat material, whereby in order to produce two lateral, substantially triangular bottom-flaps, in the vicinity of which the tubular material is in three layers, and the substantially rectangular standing surface produced thereby, the tubular material is folded in from the sides of thebag to be formed and, after a bottom longitudinal seam has been formed by pressing the said tubular material together, and connecting together the layers of tubular material thus caused to bear one upon the other, followed by separation, filling with a preferably freely flowing product is carried out, at least the two layers of the bottom-flaps, facing away from the bottom surface of the bag, being united longitudinally. The invention also relates to an apparatus for producing and filling bottom-fold bags made of endless tubular material which in one embodiment of the invention is made of endless flat material, substantially vertical mobile devices (20,22), for uniting the bottom-flap layers (38,40,42) being provided in the vicinity of the bottom-flaps (34,36), the said apparatus being more particularly for the execution of the aforesaid method. The invention furthermore relates to a bottom-fold bag comprising two substantially triangular, double-layer bottom-flaps which are fitted to adjoin a substantially rectangular bottom-surface, having a longitudinal bottom-seam, from the sides of the bottom-fold bag, in the interior thereof, at least the two layers of the bottom flaps, facing away from the bottom-surface, being connected together, the said bag being produced, more particularly by the aforesaid method and/or with the aforesaid apparatus.

BACKGROUND OF THE INVENTION

Methods and apparatuses of the types described hereinbefore are being used to an ever inceasing extent for the manufacture of bottom-fold bags, more particularly those made of an endless tubular synthetic material, for example high-pressure polyethylene. Forming the bottom-flaps serves, among other things, to provide a base whuch is as rectangular as possible, so that the bag remains upright after it has been filled. This makes it easier to store the filled bag and, especially, a bag which has already been opened by the consumer. There is, however, a difficulty in the case of known bottom-fold bags, in which the bottom flap layers are not connected together, but are merely pressed together by the product in the bag, in that, especially in the case of a product of little internal consistency, for example animal litter, granular materials, and other freely flowing goods, the bottom tends not to retain its flat configuration in a satisfactory manner, so that the bag does not stand very well.

U.S. Pat. No. 3,739,977 discloses a method of the type mentioned at the beginning hereof in which the triangular, double-walled bottom-flaps are connected together at the four corners of the lateral walls. Similar methods and bottom-fold bags are also known from U.S. Pat. Nos. 3,772,116 and 4,230,030. U.S. Pat. Nos. 4,079,662 and 4,365,459 also disclose apparatuses of the above type for the production of bottom-fold bags. It has been found, however, that the methods, apparatuses and bags in question do not satisfactorily meet the requirements of inexpensive production of bottom-fold bags, with a reliably flat configuration of the standing surface, especially in the case of freely flowing goods. A side-fold bag, disclosed in German Patent No. 830,157, in which the bottom flaps are glued to the bottom part, is also unsatisfactory in this respect.

OBJECTS OF THE INVENTION

It is therefore the purpose of ths invention to provide a method, an apparatus, and a bottom-fold bag of the type in question which are inexpensive and which ensure that the flat configuration of the substantially rectangular base is maintained, even when the bag contains a freely flowing product etc., at the same time using a minimum of power and material for uniting the various layers of tubular material.

SUMMARY OF THE INVENTION

According to the invention, and in the case of a method of the type mentioned at the beginning hereof, this purpose is accomplished in that provided substantially at right angles to the bottom longitudinal seam is at least one connecting seam arranged near the lateral edge of the bottom-fold bag, also a connecting seam arranged near the relevant bottom-flap apex, at least one of the said seams being of linear design and being divided in its longitudinal extension.

In this connection, of a hot-sealing material isused, especially a thermoplastic synthetic material, the bottom-flap layers may be hot-sealed to each other.

According to the invention, provision may also be made for the bottom-flap layers to be glued together, preferably hot-glued.

The device of the type mentioned at the beginning hereof, and proposed according to the invention, is characterized in that arranged within the formatshaft are connected lateral guide-shafts which re substantially leakproof in relation to the filling area as regards the product being filled into the bag, each of the said guide-shafts containing a vertically mobile sealing plunger by means of which the layers of the bottom-flaps may be pressed against an abutment, possibly an abutment on the transverse-sealing tool, or the said transverse-sealing tool acting as an abutment.

Provision may also be made for the sealing plungers to be heatable.

According to the invention, the abutment may also be heatable.

The invention furthermore proposes that the sealing plungers and/or the abutment be adapted to be cooled at least locally.

Devices for applying a (hot) adhesive to the surfaces of the bottom-flap layers to be glued together may also be provided.

Provision may furthermore be made for the sealing plungers to comprise an injection-device for boring through at least one of the bottom-flap layers and for introduing adhesive between the upper and the middle bottom-flap layers.

According to the invention, the apparatus may furthermore be characterized by adhesive applicators engaging laterally in the vicinity of the bottom-flaps.

Provison may also be made for the adhesive applicators to comprise an injection-device for boring through the middle bottom-flap layer and introducing adhesive between the middle and lower bottom-flap layers.

The bottom-fold bag according to the invention is characterized in that provided substantially at right angles to the bottom longitudinal seam is at least one connecting seam arranged near the lateral edge of the bag, also a connecting seam arranged near the relevant bottom-flap apex, the said connecting seams being of linear design and at least one of them being divided in its longitudinal extension.

In this connection, provision may be made for the connecting seams lying closest to the lateral edges of the bottom-fold bag to be divided in their longitudinal extension.

In the case of a bottom-fold bag according to the invention, made of a hot-sealing material, more particularly a thermoplastic synthetic material, provision may be made for the bottom-flap layers to be hot-sealed to each other.

Moreover, according to the invention, the bottom-flap layers may be glued together, preferably hot-glued.

As a result of the characteristic connection according to the invention of at least the two upper layers of the bottom-flaps, whether if be flat or in the form of connecting seams, but preferably of all three layers of the bottom-flaps, deformation of the flat, rectangular standing surface, under the action of a freely flowing conent, is largely eliminated. The bottom surface therefore remains substantially flat, allowing the bottom-fold bag to remain standing relatively upright.

Reference is made to the particular advantage of the example of embodiment of the bottom-fold bag according to the invention in which at least two of the bottom-flap layers are connected together, in the manner indicated hereinbefore, by a divided connecting seam in the vicinity of the lateral edges of the bag, or by the combination of a connecting seam thus divided and a connecting seam arranged at the respective bottom-flap apex and also divided, if necessary, since this arrangement ensures optimal transfer of the load, acting upon the bottom of the bag, to the lateral walls thereof which are stressed in tension, simultaneously with a minimal use of material and power for uniting the bottom-flap layers etc.

U.S. Pat. No. 3,739,977 describes a bottom-fold bag in which the bottom flaps are folded inwardly and are glued to the bottom, but this patent contains no reference to the preferred example of embodiment of the invention in which the preferably divided connecting seams, or an additional connecting seam, is provided adjacent one of the lateral eges of the bag, close to the bottom-flap apex. This is also the case with the bags according to U.S. Pat. Nos. 3,772,116 or 4,330,030. As a whole, therefore, these patents do not cover bags having the advantages obtainable according to the invention.

DESCRIPTION OF THE DRAWINGS

Further characteristics and advantages of the invention may be gathered from the following description in which examples of embodiment are explained in detail in conjunction with the drawing attached hereto, wherein.

DETAILED DESCRIPTION OF PREFERRED EMBODIMENTS

Figure 1A:
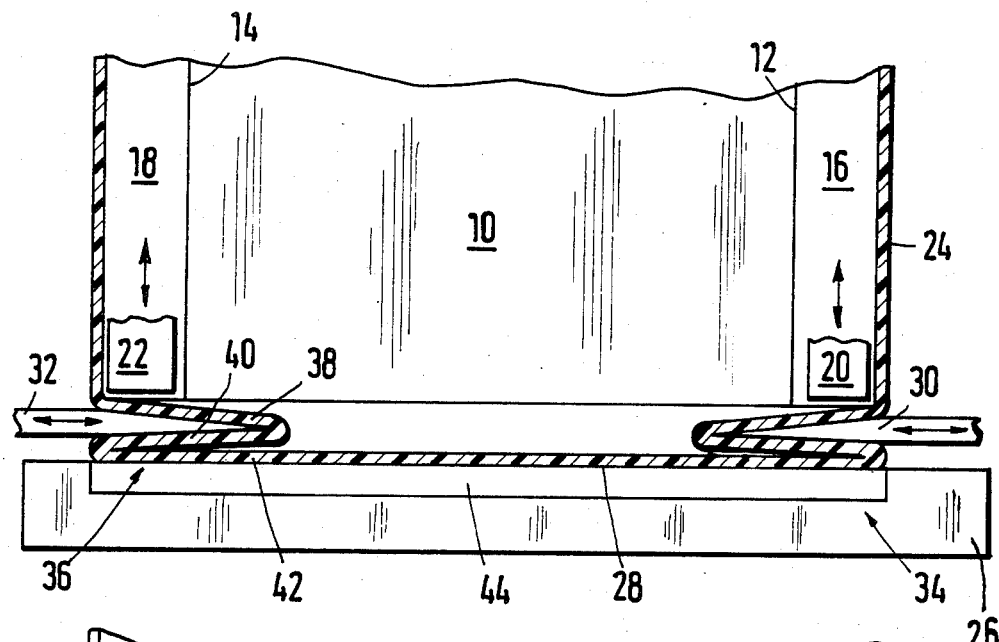
FIG. 1(a) is a vertical longitudinal section view, along a plane containing the bottom longitudinal seam of the bottom-fold bag being formed, showing the sealing plungers of one embodiment of the apparatus of the invention in a first operating position.
Figure 1B:
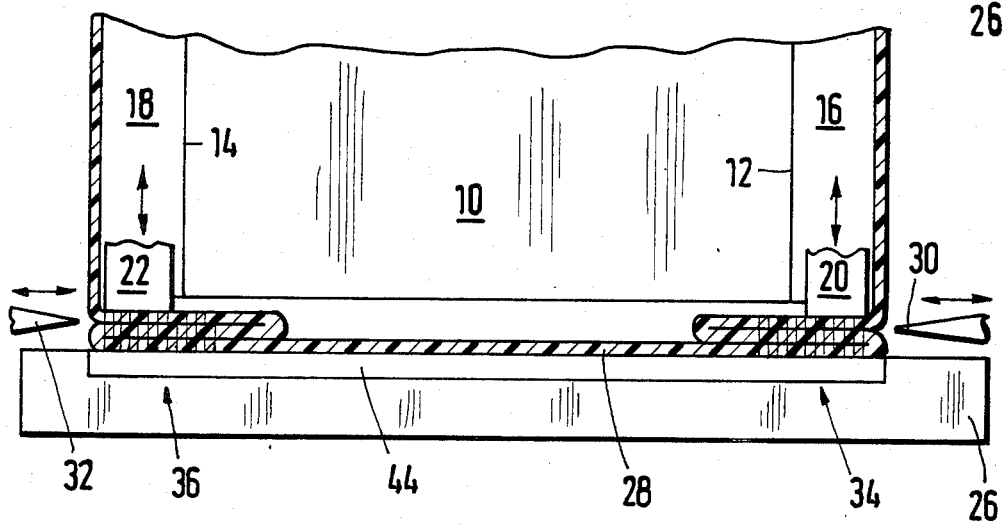
FIG. 1(b) is a vertical longitudinal section view, along a plane containing the bottom longitudinal seam of the bottom-fold bag being formed, showing the sealing plungers of one embodiment of the apparatus of the invention in a second operating position.

As shown in the example of embodiment in FIG. 1, the apparatus according to the invention comprises a vertically arranged format-shaft 10, on each side of which is formed, by means of a partition 12,14 running at right angles to the plane of the drawing, a guide-shaft 16,18 which is substantially leakproof in relation to the central filling area of format-shaft 10, as regards the product to be filled into the bag. Arranged in each guide-shaft 16,18, as shown by the arrows, is a sealing plunger 20,22, the said plungers being adapted to be actuated electrically or hydraulically, for example. A tubular foil 24, made, in the case of the example of embodiment illustrated, out of a hot-sealing thermoplastic material. to wit a high-pressure polyethylene produced in known fashion—not shown in the drawing—before reaching format-shaft 10, out of a strip of foil, is passed downwardly over the substantially rectangular external periphery of the said format-shaft. In order to form a bottom-fold bag, tubular foil 24 is pressed together, below the said format-shaft, by means of a transverse-sealing tool 26, in the form of a transverse-sealing tong with heatable jaws which is adapted to move back and forth at right angles to the plane of FIG. 1; a bottom longitidinal seam, running in the plane of the drawing, is formed simultaneously. In knonw fashion, the bag farther down, already filled, is closed off by forming an upper longitudinal seam and is, at the same time, separated from the tubular foil or the bottom-fold bag discussed here and prepared for filling. Before this, two folding tools 30,32, adapted to move back and for the horizontally in the direction of the arrows, serve to fold the material of tube from the sides of the bag to be produced, forming bottom-flaps 34,36 which are described in greater detail hereinafter and which, as seen from format-shaft 10, are of substantially triangular outline and consist of three bottom-flap layers 38, 40,42. Of these, upper layer 38 faces the interior of the bottom-fold bag to be produced, middle layer 40 bears against upper layer 38, while lower layer 42 forms a part of the bottom surface of the bag. Transverse-sealing tool 25 comprises, like sealing plungers 20,22, a flat heatable abutment 44. The movements of transverse-sealing tool 25, folding tools 30,32, and sealing plungers 20,22 are, of course synchronized in a manner obvious to one skilled in the art.

The apparatus described above operates as follows: after a sufficient length of tubular foil 24 has been drawn downwardly over the external periphery of format-shaft 10, in known fashion, bottom flaps 34,36 are folded-in, also in known fashion and therefore not described here in detail, and bottom longitidinal seam 28 is formed by appropriate actuation of folding tools 30,32 and transverse-sealing tool 26. This step of the procedure is shown at the top of FIG. 1. Thereafter, and as shown at the bottom of FIG. 1, folding tools 30,32 are moved back to the outer position of rest and, in a manner which is novel according to the invention, sealing plungers 20,22, pressing the three bottom-flap layers 38,40,42 against abutment 44 of transversesealing tool 26. All three layers are thus united, as shown in the twice crosshatched area.

Figure 2A:
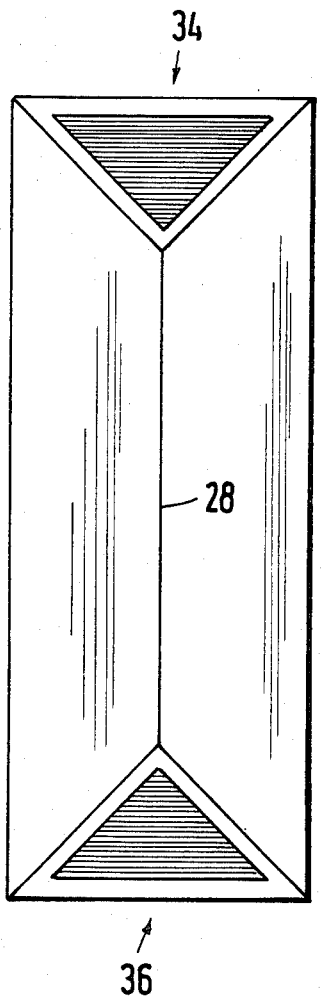
FIG. 2(a) is a view of the bottom surface of one embodiment of the bottom-fold bags of the invention, wherein the cross-hatched area shows the areas of contact between bottom-flap layers.
Figure 2B:
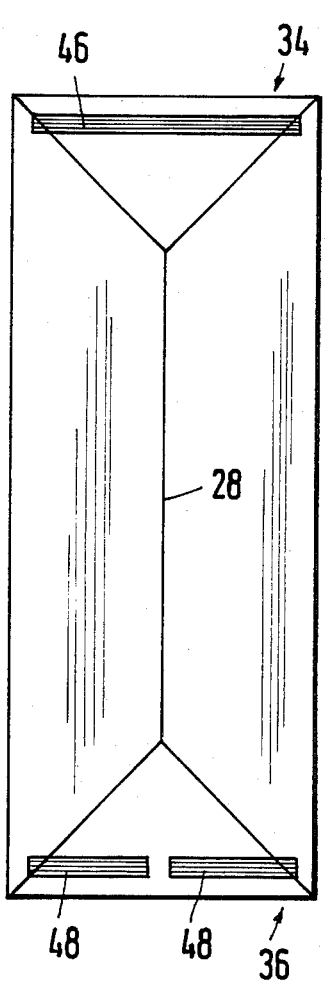
FIG. 2(b) is a view of the bottom surface of one embodiment of the bottom-fold bags according to the invention, wherein the cross-hatched areas show various types of connecting seams.
Figure 2C:
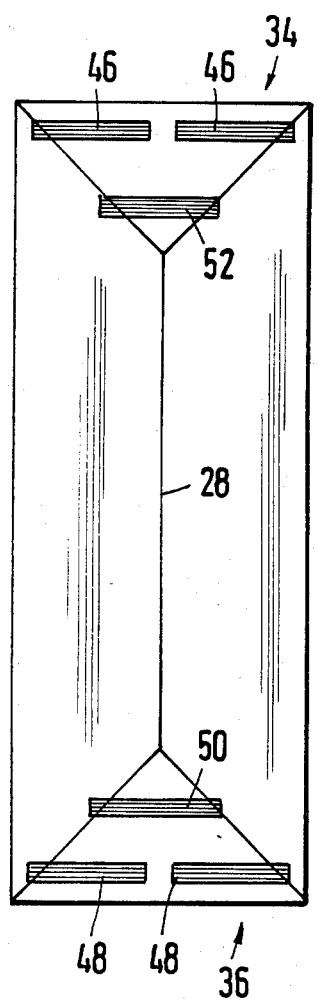
FIG. 2(c) is a view of the bottom surface of one embodiment of the bottom-fold bags according to the invention, wherein the cross-hatched areas show other alternative connecting seam arrangements.

Shown at the left of FIG. 2 is a bottom-fold bag produced by the apparatus in FIG. 1. In this case, as in the other two examples of embodiment shown in FIG. 2, the connecting areas of bottom flaps 34,36, i.e. the areas in which the three bottom-flap layers 38,40,42 are connected to each other, are shown twice crosshatched. As may be gathered from the left-hand side of FIG. 2, the connection between the individual layers of bottom-flaps 34,36 is flat.

In the example of embodiment of a bottom-fold bag adapted to be produced according to the invention, bottom-flap layers 38,40,42 are connected together only near the lateral edges of the bag, by connecting seams 46,48, seam 46 being continuous while seam 48 has a discontinuity. In the example of embodiment at the right of FIG. 2, there are connecting seams 46,48 near the edges and corresponding to the connecting seams in the central example of embodiment, and additional connecting seams 50,52 located near the apex of each bottom-flap 36,34. The left- and right-hand examples of embodiment in FIG. 1 have the advantage, over the example of embodiment shown in the middle, that "trickling" of a freely flowing product into the area between the bottom-surface and middle layer 40 of bottom-flaps 34,36, which may cause problems when the bag is being emptied, is prevented. On the other hand, the central example of embodiment in FIG. 2 has the advantage of needing less sealing to produce connecting seams 46,48. It is to be understood that the different forms of sealing areas shown in FIG. 2 may be produced by appropriate shaping and configuration of sealing plungers 20, 22 and abutment 44. Control of the local cooling, either of abutment 44 alone or also of sealing plungers 20,22, makes it possible to determined whether only the two upper layers, or all three layers of bottom-flaps 34,36 are connected together. It is, of course, also posible, especially if non-heat-sealing material, such as tubular paper, is used to produce the bottom-fold bag, to introduce an adhesive, preferably a hot adhesive, by means of appropriate devices, between individual bottom-flap layers 38,40,42, if necessary, with local piercing of the necessary layer by means of suitable injection-devices, in which case the entire connection is effected by gluing.

Figure 3:
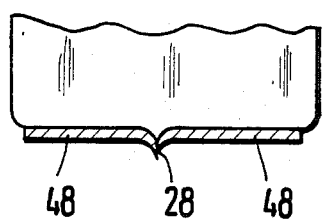
FIG. 3 is a vertical longitudinal section view, at right angles to the bottom longitudinal seam, of one end of a bottom-fold bag, such as shown in FIG. 2(b) or FIG. 2(c).

FIG. 3 shows the arrangement of connecting seam 48 of the central example of embodiment in FIG. 2 in relation to bottom longitudinal seam 28. It may also be gathered from FIGS. 2 and 3 that the bottom-fold bags thus produced have a substantially rectangular standing- or bottom-surface. This is regarded as an advantage essential to the invention and, as a result of the bottom-flap sealing or gluing, it remains substantially flat, even if the product in the bag lacks internal consistency. The bottom-fold bag according to the invention may therefore be relied upon to remain upright on its substantially rectangular bottom surface.

The embodiments of the invention in which an exclusive property or privilege is claimed are defined as follows:

1. A method for producing bottom-fold bags from endless tubular material comprising:

inwardly folding the tubular material along a first pair of oppositely spaced fold lines at a juncture of the tubular material and the ends of a flat bottom of the bag being formed to form two lateral, substantially triangularly shaped, inwardly-facing bottom flaps, in the vicinity of which the tubular material is in three layers;

simultaneously, inwardly folding the tubular material along a second pair of oppositely spaced fold lines at a juncture of the tubular material and the sides of a flat bottom of the bag being formed, perpendicular to the first pair of fold lines, to form two substantially trapezoidal shaped, inwardly-facing longitudinal bottom flaps;

pressing the tubular material forming the two substantially triangular shaped inwardly-facing bottom flaps together and connecting at least two of the three layers;

pressing the two trapezoidal shaped longitudinal bottom flaps together and connecting them such that they form a bottom longitudinal seam therebetween, parallel to the second pair of fold lines and perpendicular to the first pair of fold lines, and such that they partially overlap and abut the two triangularly shaped lateral bottom flaps to thereby form a rectangularly shaped flat bottom surface to the tubular material capable of supporting the bag thus formed from the tubular material in a standing position when filled:

providing at least one connecting seam substantially at right angles to the bottom longitudinal seam, arranged near each lateral edge of the bag; and providing at least one connecting seam substantially at right angles to the bottom longitudinal seam, arranged near each apex of a triangle formed by the abutment of the inwardly folded triangular shaped lateral bottom flaps and the inwardly folded trapezoidal shaped longitudinal bottom flaps;

such that at least one of the connecting seams is linear and is divided in its longitudinal extension.

2. The method of claim 1 further comprising producing a top-fold on the bag by separating an upper end of the bottom-fold bag just formed from the endless tubular material; and closing the bag after filling by repeating the steps of claim 1 to form a rectangularly shaped flat top surface of the bag from the tubular-material end of the bag opposite to the bottom-fold.

3. The method according to claim 1, wherein the endless tubular material is made of endless flat material.

4. The method according to claim 1, wherein the endless tubular material is a heat-sealable material.

5. The method according to claim 4, wherein the heat-sealable material is a thermoplastic synthetic material.

6. The method according to claim 5, wherein the thermoplastic synthetic material is high-pressure polyethylene.

7. The method according to claim 4, wherein the layers of the triangularly shaped lateral bottom flaps are heat-sealed to each other.

8. The method according to claim 1, wherein the layers of the triangularly shaped lateral bottom flaps are glued together.

9. The method according to claim 7, wherein the layers of the triangularly shaped lateral bottom flaps are hot-glued.

10. An apparatus for producing and filling bottom-fold bags made of endless tubular material comprising:
expansion means for maintaining an expanded shaft of the tubular material and over which the expanded shaft of tubular material is passed;
guide means for guiding the expanded shaft of tubular material and which provides a substantially leak-proof central filling zone for the bag being formed;
folding means for producing an inward fold in the expanded shaft of the tubular material as it passes over the expansion means to form a flat rectangularly-shaped bottom surface on the bag being formed, the bottom surface having lateral triangularly shaped bottom flaps, and longitudinal trapezoidal shaped bottom flaps, with the tubular material in the vicinity of the triangularly shaped flaps being triple-folded;
first sealing means for pressing together the folded-over layers of the tubular material in the vicinity of the triangularly shaped flaps;
second sealing means which cooperate with the expansion means and the folding means to seal the lateral triangularly shaped bottom flaps and the longitudinal trapezoidal shaped bottom flaps and form a longitudinal seam between the longitudinal flaps;
third sealing means for forming at least one connecting seam at the bottom of the bag being formed near each lateral edge of the bag and for forming at least one connecting seam near the apex of a triangle formed by the abutment of the lateral triangularly shaped bottom flaps and the longitudinal trapezoidal shaped bottom flaps, such that at least one of the connecting seams is linear and is divided in its longitudinal extension.

11. The apparatus of claim 10 wherein the expansion means is a format shaft.

12. The apparatus of claim 11 wherein the guide means is a guide shaft at each side of the format shaft formed by a partition at each side parallel to the format shaft.

13. The apparatus of claim 11 wherein the folding means is a folding tool at each side of the format shaft oriented perpendicularly to and situated just below the format shaft which is capable of moving from a first, outer position of rest to a second, inner-actuated position wherein the folding tool is horizontally projected into the tubular material from each side to cause the tubular material to be inwardly folded.

14. The apparatus of claim 12 wherein the first sealing means is a vertically mobile sealing plunger located in each guide shaft.

15. The apparatus of claim 14 wherein the sealing plungers are electrically activated.

16. The apparatus of claim 14 wherein the sealing plungers are hydraulically activated.

17. The apparatus of claim 14 wherein the sealing plungers further comprise means for boring through at least one of the multiple layers of tubular material in the vicinity of the bottom flaps and introducing adhesive between at least two of the layers of the tubular material.

18. The apparatus of claim 17 wherein the adhesive is injected between an upper and a middle layer of the tubular material in the vicinity of the bottom flaps.

19. The apparatus of claim 17 wherein the adhesive is injected between a middle and a lower layer of the tubular-material in the vicinity of the bottom flaps.

20. The apparatus of claim 17 further comprising adhesive applicators which engage laterally in the vicinity at the bottom flaps.

21. The apparatus of claim 13 wherein the second sealing means is a transverse sealing tool located below the format shaft and which cooperates with the format shaft and the folding tools to form the lateral and longitudinal bottom flaps and the longitudinal bottom seam.

22. The apparatus of claim 21 wherein the transverse sealing tool is a transverse sealing tong with heatable jaws adapted to move back and forth at right angles to the format shaft.

23. An apparatus for producing and filling bottom-folding bags made of endless tubular material, which comprises:
a format shaft having a substantially rectangular external periphery over which the tubular material is downwardly passed;
a guide shaft at each side of the format shaft, formed by a partition at each side parallel to the format shaft, which is substantially leakproof in relation to a central filling area of the format shaft;
a sealing plunger in each guide shaft for pressing together layers of the tubular material which have been folded over onto one another;
a horizontally positioned folding tool at each side of the format shaft oriented perpendicularly to and situated just below the format shaft which is capable of moving from a first, outer position of rest to a second inner, actuated position wherein the folding tool is horizontally projected in the tubular material from each side to cause the tubular material to be inwardly folded thereby producing a triple layer of the tubular material in the vicinity of the fold;
a transverse sealing tool located below the format shaft which cooperates with the format shaft and the folding tools to form the lateral and longitudinal bottom flaps and the longitudinal bottom seam of the bottom-fold bag being formed; and
means for forming at least one connecting seam at the bottom of the bag being formed near each lateral edge of the bag and for forming at least one connecting seam near the apex of a triangle formed by the abutment of the lateral triangularly shaped bottom flaps and the longitudinal trapezoidal shaped bottom flaps, such that at least one of the connecting seams is linear and is divided in its longitudinal extension.

24. A bottom-fold bag made from endless tubular material comprising a substantially rectangular flat bottom having two lateral, substantially triangularly shaped, inwardly-facing bottom flaps, in the vicinity of which the tubular material is in three layers, the triangularly shaped flaps being formed by inwardly folding the tubular material along a first pair of oppositely spaced fold lines at a juncture of the tubular material and the ends of the flat bottom of the bag being formed and the flat bottom of the bag additionally having two substantially trapezoidal shaped, inwardly-facing longitudinal bottom flaps, formed by simultaneously inwardly folding the tubular material along a second pair of oppositely spaced fold lines at a juncture of the tubular material and the sides of the flat bottom of the bag being formed, the second pair of fold lines being perpendicular to the first pair of fold lines; the flat bottom of the bag further having a bottom longitudinal seam formed by pressing together and connecting the two trapezoidal shaped longitudinal bottom flaps in such way that they partially overlap and abut the two triangularly shaped lateral bottom flaps; and the flat bottom of the bag having at least one connecting seam substantially at right angles to the bottom longitudinal seam, arranged near each lateral edge of the bag and at least one connecting seam, substantially at right angles to the bottom longitudinal seam, arranged near each apex of a triangle formed by the abutment of the inwardly folded triangular shaped lateral bottom flaps and the inwardly folded trapezoidal shaped longitudinal bottom flaps, such that at least one of the connecting seams is linear and is divided in its longitudinal extension.

* * * * *